United States Patent [19]

Tezuka et al.

[11] Patent Number: 4,952,433

[45] Date of Patent: Aug. 28, 1990

[54] CONTINUOUS LABEL PAPER AND A METHOD TO PREPARE IT

[75] Inventors: Motohiko Tezuka, Chiba; Jiunichi Tabuchi, Tokyo; Yoshihide Okubo; Takeshi Kobayashi, both of Chiba, all of Japan

[73] Assignee: Toppan Moore Co., Ltd., Tokyo, Japan

[21] Appl. No.: 251,090

[22] Filed: Sep. 29, 1988

[51] Int. Cl.[5] .......................... B32B 3/10; B32B 7/06; B32B 7/12

[52] U.S. Cl. ....................................... 428/42; 428/43; 428/78; 428/137; 281/5; 282/12 R

[58] Field of Search .................... 428/42, 43, 78, 138, 428/40, 137; 281/5; 282/12 R

[56] References Cited

U.S. PATENT DOCUMENTS 3,993,814 11/1976 Cavender .............................. 281/5

*Primary Examiner*—Alexander S. Thomas
*Attorney, Agent, or Firm*—Wenderoth, Lind & Ponack

[57] ABSTRACT

A continuous label paper with a number of tractor-feed transfer holes formed with equal spacings along both lateral ends of a release sheet, and unit label sheets, partitioning a certain number of label pieces, are detachably mounted on the release sheet with equal spacings in the longitudinal direction. The label unit sheets have edges which are spaced from the portions with transfer holes on the release sheet. A method to prepare the continuous label paper from continuous paper detachably mounted on the release sheet by simultaneously removing unnecessary portions of the continuous paper outside each unit label sheet.

3 Claims, 5 Drawing Sheets

CONTINUOUS LABEL PAPER AND A METHOD TO PREPARE IT

BACKGROUND OF THE INVENTION

The present invention relates to continuous label paper prepared from continuous paper consisting of a label sheet provided with label pieces and a release sheet, detachably attached to the back side of the label sheet, and also to a method to prepare it.

In the conventional type of continuous label paper, continuous paper is provided, where a release sheet is attached in a detachable manner on the back side of a label sheet coated with adhesive, and a portion with transfer holes is furnished, where a number of transfer holes are provided with equal spacings along both lateral ends. Perforation lines are provided on the label sheet, except in the portion with transfer holes, in order to form label pieces which can be attached to envelopes and other commodities with different information and data such as addresses, product numbers, product names, etc. The transfer holes of the continuous label paper engage with the tractor pins of the printer and address information, delivery data, etc. are printed on the label pieces by moving the continuous label paper.

In such conventional continuous label paper, however, when printing is performed on a large quantity of continuous label paper, especially in a non-impact printer which prints by toner the adhesive coming out of the transfer holes of the continuous label paper is attached and accumulated on and around the tractor pins of the printer and often contaminates the photosensitive drum, thus adversely affecting the movement of subsequent continuous label paper.

To overcome such a disadvantage, a type of continuous label paper is known where the portion of the label sheet with transfer holes is eliminated in order to prevent the adhesive from coming out of the transfer holes. However, in preparing the continuous label paper of such type, the toner on the surface of photosensitive drum of non-impact printer is attached to the portion of the release sheet with transfer holes which is exposed because the portion of the release sheet with transfer holes is now eliminated. Since the toner is further attached and accumulated in zonal form on the fixed roller or other parts of the non-impact printer, the jamming of continuous label paper is frequently caused. Especially, zonal contamination often occurs when continuous label papers having different lateral sizes are used.

In order to eliminate all of such disadvantages, a new type of continuous label paper 100 has been proposed in Japanese Utility Model Publication Sho 61-41105). As shown in FIGS. 7 (*a*) to (*c*), the continuous label paper consists of release sheet (103) detachably mounted on a back side of label sheet (102), which is coated with adhesive (101). Transfer holes (104) are provided along both lateral ends of the label paper with equal spacings. Both, lateral ends of the label sheet are undulated so that the label sheet (102) does not come into contact with the transfer holes (104) and reaches the lateral end of the continuous label paper only between transfer holes (104).

To prepare this continuous label paper (100) it is necessary to have a process to detach the external portion which matches the transfer holes (104) and which is not needed because both lateral ends of the label sheet (102) are shaped in uneven and irregular form.

However, as it is shown by solid lines in FIG. 7, the external portions, matching the transfer holes (104) of the label sheet (102) and not needed now, are not continuous in the longitudinal direction but separated from each other. Accordingly, it is not possible to efficiently detach the external portion of said label sheet (102) in a continuous manner.

There is a method to exclude such disadvantages. As shown by dot-dash lines in FIG. 7 (*a*), it is proposed to make the width of continuous label paper wider at first. After the unnecessary portion of the label sheet (102) is detached, the extended portion (**103*a*) of the remaining release sheet (103**) is removed by cutting to form the paper in the width as originally desired.

Even by this method, however, there exist the sufficiently wide segment (the segment where label sheet (102) is recessed to match the transfer holes (104)) and the very narrow segment (the segment where the label sheet (102) protrudes), and the paper is often cut off at this very narrow segment during the detachment. Because the unnecessary portions of both ends are independent from each other, the continuity of the unnecessary portions of the detached label sheet (102) is lost if these are cut off, and smooth detachment process is thus hindered.

In the transfer system, where the printing paper is transferred into contact with a preheated board through a vacuum device in order to fix the toner, when the non-impact printer is used, smooth printing is not achievable because of poor air penetration because the label paper is of a 3-layer structure consisting of the label sheet, adhesive and detachment sheet. Specifically, excessive vacuum occurs during the transfer operation and smooth movement is not accomplished because the resistance in the transfer direction is increased. In addition, toner often falls off due to excessive contact and contaminates the interior of the printer.

The first objective of the present invention is to provide a continuous label paper to eliminate the disadvantages of the conventional label paper as shown in FIG. 7 and a method to prepare such paper. The second objective of this invention is to offer a continuous label paper suitable for printing by a non-impact printer using toner to print various information and data such as addresses, product names, etc. to the surface of label pieces, and a method to prepare such label paper. The third objective of this invention is to furnish a continuous label paper, by which smooth printing is achievable by the printer using a vacuum during the transfer process.

BRIEF SUMMARY OF THE INVENTION

For the attainment of the above objectives, the continuous label paper according to this invention comprises a continuous paper consisting of a label sheet coated with adhesive on its back side and of a release sheet, which is detachably attached to the back side of this label sheet. Slits are formed at the positions corresponding to the finishing width of the release sheet, and a number of transfer holes are furnished along both ,lateral ends with equal spacing. A number of equally spaced perforations are formed to facilitate folding in the longitudinal direction. Further, a number of label pieces are formed on the label sheet, and both lateral ends, including the portions with transfer holes of the label sheet, and the zonal portions with spacings in longitudinal direction, including at least the perforations, are detached and removed. At the same time, the portion outside the slits on said detachment sheet are removed, and the edges of the detached portions on both lateral ends do not come into contact with the portions with transfer holes. (In this specification, this includes the portions where holes are planned.) The edge is extended in irregular form among the transfer holes so that it is allocated closer to the ends than said portion with transfer holes toward both lateral ends. It is desirable that the edges opposing to each other of the zonal detached and removed portion in label sheet have non-linear shape.

According to the present invention, said detached and removed portion is continuous, and the processes to detach and remove this portion are performed at the same time. Specifically, the processes consist of a transfer holes making process to provide transfer holes with equal spacings along both ends of continuous paper, which is to become the continuous label paper, a finishing width setting process to form slits at the positions corresponding to the finishing width of detachment sheet, a label pieces forming process to furnish perforation lines to form label pieces on label sheet, a partition forming process to provide perforation lines on label sheet to make partitions for a certain number of label pieces with equal spacings in longitudinal direction, and edges do not come into contact with the portion with transfer holes and are formed in irregular shape so that they are positioned closer to the ends than said portion with transfer holes toward both lateral ends between each of the portion with transfer holes, a perforation line making process to form perforation lines to facilitate the folding of continuous paper in longitudinal direction with equal spacings. These processes may be arranged with no specific order. At least after said partition forming process and said finishing width setting process, a detachment process is performed to detach simultaneously the external portion of the perforation line of label sheet as prepared by the partition forming process and the external portion of the slits of detachment sheet as prepared by the finishing width setting process.

Because each unit of label sheets as partitioned to contain a fixed number (either single or plural) of label pieces is formed with equal spacings in longitudinal direction according to the present invention, both lateral ends of the continuous paper furnished with the transfer holes are laterally connected at the portions corresponding to the said spacings, and the unnecessary portions of label sheet are turned into the shape of ladder and are detached. Consequently, the continuity is maintained as a whole even when the lateral ends are cut off, and smooth detaching movement can be performed. By providing small holes, air penetration is improved, and the transfer to continuous label paper during printing can be performed in better way.

BRIEF DESCRIPTION OF THE DRAWINGS

FIG. 7(*b*) is a cross-section along line A—A in FIG. 7(*a*).

FIG. 7(*c*) is a cross-section along line B—B in FIG. 7(*a*).

DETAILED DESCRIPTION OF THE INVENTION

Figure 1:
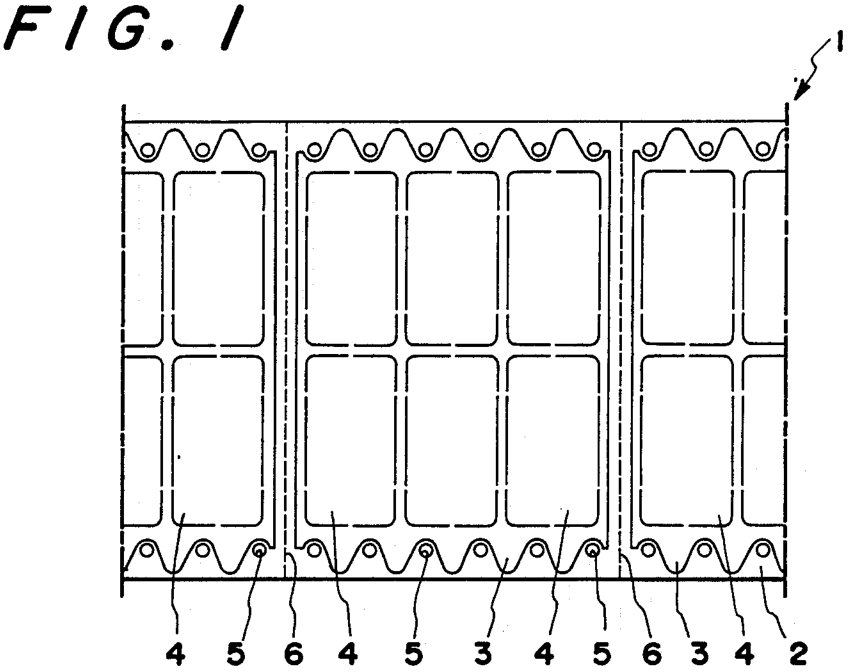
FIG. 1 is a plan view of the continuous label paper.

The details of the continuous label paper of the present invention are described in conjunction with FIG. 1.

The continuous label paper (1) consists of a release (2) in continuous form with a release treatment on the surface thereof and of a number of unit label sheets (3), attached to the release sheet (2) by adhesive (25) coated on back side, (See FIG. 5) and detachably mounted with equal spacings in the longitudinal direction. Each of the unit label sheets (3) constitutes a partition, and 6 label pieces (4) are shown formed on each of unit label sheets (3). In other words, a partition is formed for every 6 label pieces (4) with equal spacings in the longitudinal direction, and the cut line of each label piece (4) is partially separated. A number of transfer holes (5) are provided on the release sheet (2), with equal spacings, along both lateral ends. At the positions corresponding to the spacings between each of the unit label sheets (3) on the release sheet (2), the perforation line (6) extending to lateral direction is furnished to facilitate folding of the continuous label paper (1), for every unit label sheet (3). The lateral edges of the unit label sheet (3) do not come into contact with each transfer hole (5), but extend in irregular form so that it is allocated closer to the ends than the transfer hole (5,) toward both lateral ends. Specifically, each of the unit label sheets (3) is formed by detaching and removing both lateral ends, including a portion with transfer holes (5) of a label sheet (7) (See FIG. 3) and a zonal portion with spacings furnished with perforation line (6).

Figure 2:
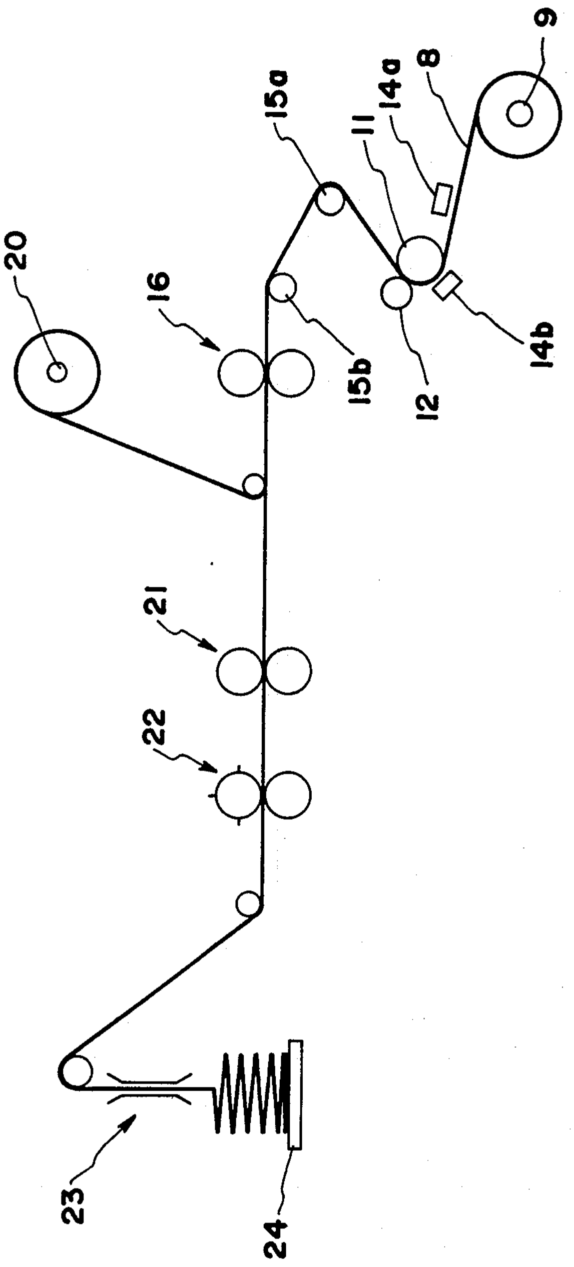
FIG. 2 is a schematic side view of an apparatus to prepare the continuous label paper.
Figure 3:
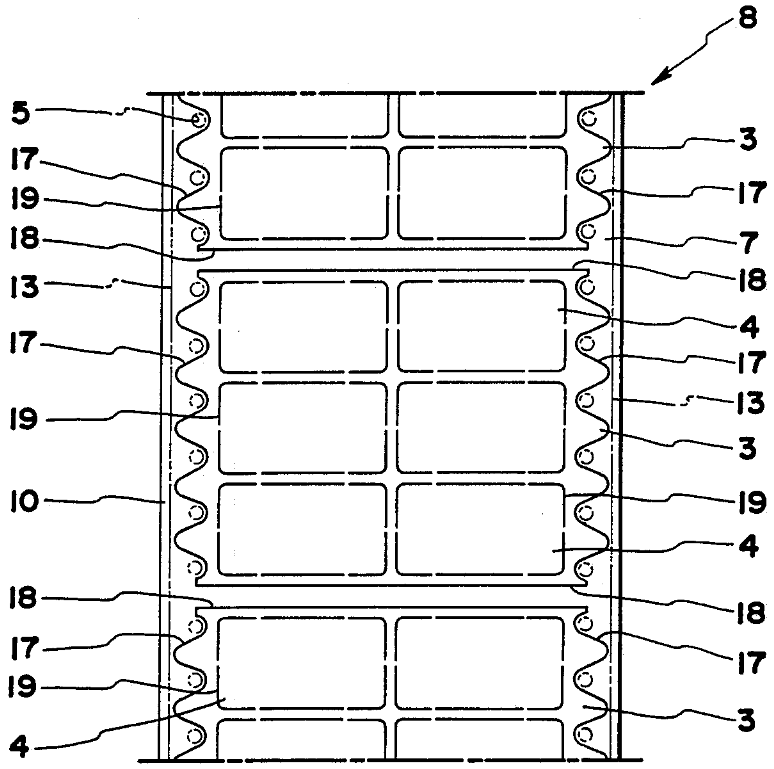
FIG. 3 is a plan view of the continuous paper during preparation.
Figure 4:
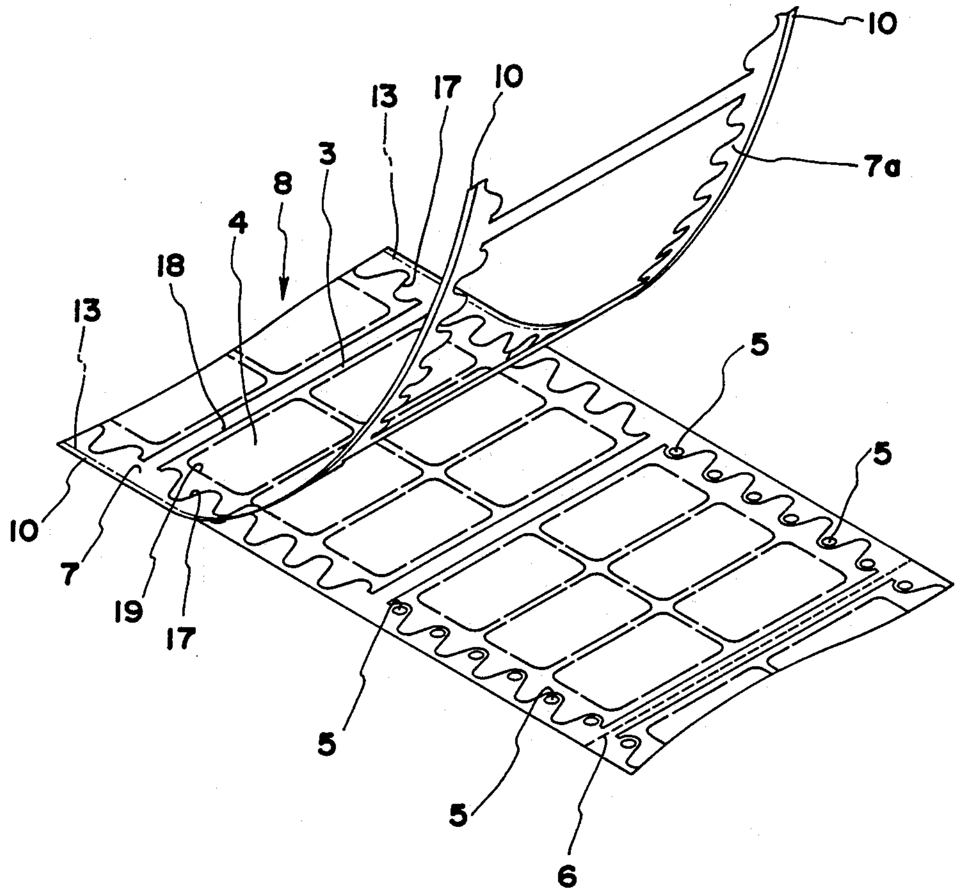
FIG. 4 is a perspective view of the same.
Figure 5:
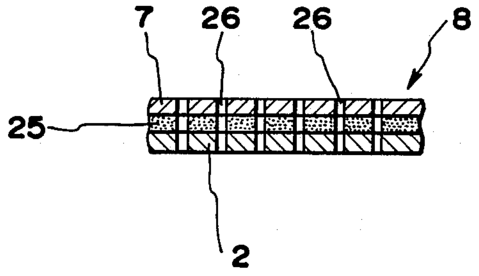
FIG. 5 is a partially enlarged cross-sectional view of the continuous label paper.

Next, a description is given of the method to prepare the continuous label paper (1), as shown in FIG. 1, in conjunction with FIG. 2 to FIG. 4. As shown in FIG. 5, the detachment sheet (2) with detaching treatment on its surface is detachably mounted on the back side of the label sheet (7) coated with adhesive (25). For better air penetration, 1 to 5 small visible holes (26) are provided per 1 $cm^2$ according to the material of the continuous paper (8).

As shown in FIG. 3, the continuous paper (8) rolled up by the rotating roller (9) has surplus width (extended portion) (10) on both ends so that it is wider than the finishing width (shown by dot-dash lines in FIG. 3), as is evident from FIG. 3 and FIG. 4. The paper (8) is fed intermittently from the rotating roller (9), and fabrication is performed successively in the transfer process.

As shown in FIG. 2, the continuous paper (8) thus fed is first introduced into the dust removal units **(14*a*) and (14*b*) with the release sheet (2) below (See FIG. 4.), and the paper dust attached on surfaces of the release sheet (2) and label sheet (7) is removed. Next, slits (13) are formed, by a half-slitter (12) mounted opposing a feeding roller (11), on the boundary between the detachment sheet (2) and the extended portion (10). (See dot-dash line in FIG. 3**.)

Then the continuous paper (8) as guided by guide rollers **(15*a*) and (15*b*) is sent to a die-cut cylinder (16) as shown in FIG. 2**. Although not shown in the drawing, a blade of irregular shape is provided on the die-cut cylinder (16) to form an irregular continuous cut line (17) of fixed length (See FIG. 3) to match the unit label sheet (3) on the label sheet (7) so that it does not come into contact with the portions, where transfer holes are planned (See FIG. 1 and FIG. 3) and shaped in recessed form on or around the portions for the planned transfer holes. Also not shown in the drawing, the cutting blade is provided on the die-cut cylinder (16) to form a cut line (18) (See FIG. 3) on the label sheet (7) in order to produce the unit label sheet (3) for mutual connection between the cut lines (17) and for the partition of continuous paper (8) with equal spacing in an longitudinal direction. Also not shown in the drawing, the cutting blade is provided on the die-cut cylinder (16) to form 6 partially separated and approximately rectangular cut lines (19) (See FIG. 3) to furnish 6 label pieces (4) in the unit label sheet (3) and to form the corner in an R-shaped form. Consequently, the cut lines (17), (18) and (19) as described above are formed when the continuous paper (8) passes through the die-cut cylinder (16) as shown in FIG. 2. In other words, the partition forming process and label piece forming process of the label sheet (7) are performed by the die-cut cylinder (16) at the same time.

As it is clear from FIG. 2, the transferred continuous paper (8) is detached when the unnecessary portion (*7a*), located outside the cut lines (17) and (18) formed by the partition forming process of the label sheet (7), is rolled up on the detachment cylinder (20). In this case, the extended portion (10), located outside the slit (13) of the detachment sheet (2), is also rolled up on the detachment cylinder (2) together with the unnecessary portion (*7a*). (See FIG. 4.) In other words, the detachment process is performed by the detachment cylinder (20). As is evident from FIG. 4, the unnecessary portion (*7a*) is shaped in the form of a ladder and can maintain its continuity as a whole even if it is partially cut off, and the above detachment process can be performed in a smooth and assured manner.

In case the slits of the detachment sheet (2) are not adequately positioned and are placed more outwardly than the proper position, slitting should be performed to slit a excessive portion by the slitter (not shown) set to the finishing width after the above detachment process.

Further, as shown in FIG. 2, the continuous paper (8) is introduced into the transfer hole forming unit (21), which in turn forms the transfer holes with equal spacings along both ends of the release sheet (2). (See FIG. 4.)

Next, the continuous paper (8) is sent to the perforating unit (22) as shown in FIG. 2, and the perforation line (6) for folding is formed on the exposed portion of release sheet (2) corresponding to the unit label sheet (3). (See FIG. 4.)

Thus, the continuous paper (8) is turned into the continuous label paper (1) shown in FIG. 1. Guided by a pendulum type folder (23) shown in FIG. 2, it is folded at each perforation line (6) stacked up successively on a stacker (24).

Figure 7A:
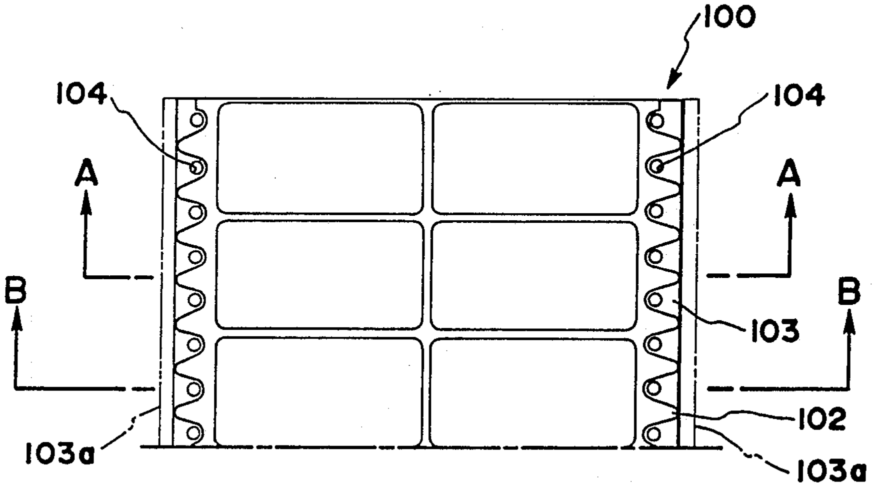
FIG. 7(a) (PRIOR ART)
FIG. 7(*a*) is a plan view of prior art label paper.
Figure 7B:
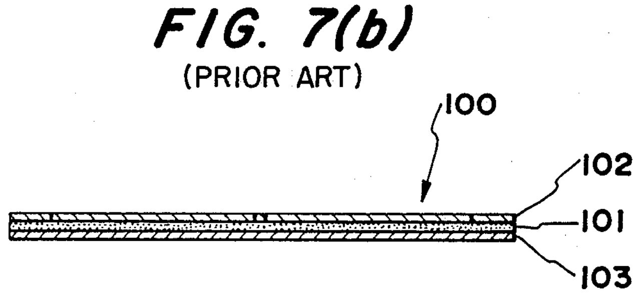
FIG. 7(b) (PRIOR ART)
Figure 7C:
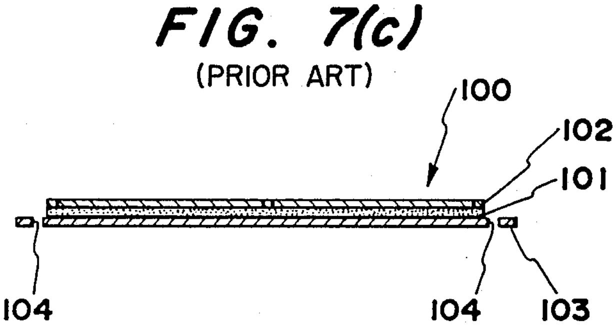
FIG. 7(c) (PRIOR ART)

The continuous label paper (1) thus prepared can provide the same effects as the continuous label paper (100) shown in FIG. 7 because the adhesive on or around the transfer holes (5) is removed. Because the extended portion (10) exists until the detachment process is performed according to this embodiment, it is advantageous in that both lateral ends of continuous paper (8) can be fabricated a strong and firm condition.

As shown in FIG. 5, 1–5 small visible holes (26) are furnished per 1 $cm^2$ of continuous paper (8) by a corona discharge unit. In the conventional type of label paper, 5000 seconds or more were required for the penetration of the air of 100 cc by the air permeability tester in accordance with JIS P 8117. This can be now reduced to 30–150 seconds. JIS P 8117 is one of the Japanese Industrial Standards, prescribing the method to test air permeability of paper and paperboard, through which 100 me of air passes in 2–1800 seconds through area of 645 $mm^2$. The tester according to this standard consists of an outer cylinder partially filled with oil and an inner cylinder, which moves freely through the outer cylinder and is open or closed at an upper end. The inner cylinder is taken out and filled with the substance under test. It is then placed into the outer cylinder and is gradually moved down to float in oil. When the movement is stabilized, the time required for the scale (0–100 me) on inner cylinder to pass through the upper edge of outer cylinder is measured by a stopwatch.

Figure 6:
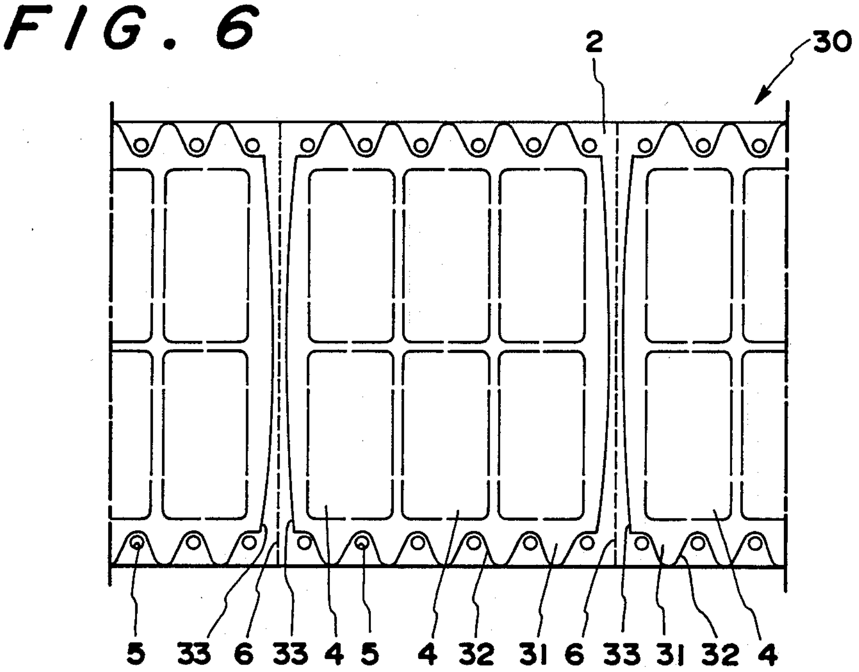
FIG. 6 is a plan view of another embodiment of the continuous label paper.

FIG. 6 shows another embodiment of the continuous label paper (30) according to the present invention. This differs from the above-mentioned embodiment in that the outermost position of the cutting line (32), which is irregular cutting line to form a unit label sheet (31) before the detachment process, reaches the end of the finishing width of continuous label paper (30), and that out edges (33), which are the cut lines extending in the lateral direction and opposing each other with spacings before the detachment process, is now formed in the shape of a curve, swelling at its center. The other details of the continuous label paper is not described here because they are the same as the continuous label paper (1) described above. Simply, the same code numbers are allocated for reference.

In order to prepare continuous label paper of this type, the setting position of an irregular blade on the die-cut cylinder of the above-mentioned embodiment to form the cut which will become the cut edge (32) later, should be changed. Also, the shape of the cutting blade to form the cut line, which will become the cut edge (33) later, should be changed, and the slitting process should be performed to set the finishing width after the detachment process. In other points, all processes are the same as described for the first embodiment. If the setting position of the irregular blade (to form the cut line, later turned to the cut edge) is changed or not changed and if the slitting process is not performed in this embodiment, it can be formed, as in the case of the first embodiment, with the outermost position of the cut edge (32) not reaching both lateral ends of the continuous label paper (30).

As described in this embodiment, if the cut edges (33), which will later become the cut lines extending in the lateral direction and opposing each other with spacings before the detachment process, are formed in a curve swelling at its center, no folding is made along the cut edge (33) in the folding of continuous label paper (30), but folding can be achieved definitely at the perforation line (6).

As stated above, small holes (26) are furnished on continuous label papers (1) and (30) to have air permeability of 30–150 seconds, and the transfer of continuous label paper (1) and (30) was proven to be excellent with most of the printers by the print test with several types of non-impact printers. For air permeability of 100 seconds or less, the same very good transfer results have been obtained as which normal high-quality paper, and the printing condition was also good because toner and ink are fixed well. Since small holes (26) are of visible size, no trouble is caused in the printing of label pieces (4), and there occurs neither hindrance nor inconvenience to the adhesive function or appearance of label pieces (4).

It should be understood that this invention is not limited to the embodiments as described above. For instance, the transfer holes forming process, the label pieces forming process and the partition forming process may be performed in any order, and there is no need to perform the label pieces forming process and the partition forming process at the same time. Also, the irregular form of the cut line, which is to become the cut line (17) or the cut edge (32) later, is not limited to a curved shape, and it may have the shape of polygonal lines such as triangular, rectangular, etc. Further, in the label pieces forming process, the number of the label pieces (4) to be formed in the unit label sheets (3) and (31) (including the planned portion) is not limited to 6, but it may be one or more as required. If the number of label pieces is one, the cut line (18) extending in the lateral direction of the continuous paper (8) the partition forming process can be simultaneously used as the cut line of the label piece (4) extending in the same direction. It does not matter whether the outermost position of the irregular cut line (18) or the cut line which is to become the cut line (32)) reaches the finishing width end of continuous label paper (1), or whether the cut lines (18) extending in the lateral direction and opposing each other with spacings (or the cutting line which is to become the cut edge (33)) is of a linear shape or of a curved shape with swelling at its center. Any combination will suffice. The perforation line (6) to be formed between unit label sheets (3) and (31) (including the planned portion) should not be necessarily formed between each of the unit label sheets (3) and (31), but it may be formed at every other sheet.

As it is evident from the above description, the continuous label paper suitable for an non-impact printer can be easily and efficiently prepared according to the present invention. Especially, since the unnecessary label sheet to be detached in the detachment process is in the form of ladder and is detached in the condition laterally coupled to both lateral ends, it can maintain its continuity as a whole even if it is partially cut off during detachment, and this ensures trouble-free and assured detachment operation. Also, better air permeability is obtained because there are a number of small holes, and the printing operation by a non-impact printer can be smoothly and efficiently performed.

We claim:

1. Continuous label paper comprising:

a release sheet elongated in a longitudinal direction;

a plurality of longitudinally spaced transfer holes extending through said release sheet adjacent respective lateral ends thereof;

a plurality of perforation lines extending between said lateral ends of said release sheet and through said release sheet, said perforation lines being longitudinally spaced along said release sheet;

a plurality of label sheets, each defined by a pair of lateral cut lines and a pair of longitudinal cut lines, each said label sheet being adhesively attached to said release sheet between a respective adjacent pair of said perforation lines with said lateral cut lines spaced inwardly of said respective adjacent pair of said perforation lines, said longitudinal cut lines forming a pattern repetitious in the longitudinal direction and being spaced from said transfer holes;

a plurality of cut lines extending through each of said label sheets to thereby define at least one label in each of said label sheets; and a plurality of small holes spaced over the area of, and extending through, said continuous label paper to thereby increase the air permeability of said continuous label paper.

2. Label paper as in claim 1, wherein said lateral cut lines are curvilinear.

3. Label paper as in claim 1, wherein said plurality of small holes comprises 1 to 5 holes per 1 $cm^2$.

* * * * *